United States Patent
Asumi

(10) Patent No.: US 9,219,794 B2
(45) Date of Patent: Dec. 22, 2015

(54) INFORMATION PROCESSING APPARATUS AND NON-TRANSITORY COMPUTER READABLE MEDIUM STORING INFORMATION PROCESSING PROGRAM

(71) Applicant: FUJI XEROX CO., LTD., Tokyo (JP)

(72) Inventor: Taishi Asumi, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 419 days.

(21) Appl. No.: 13/624,302

(22) Filed: Sep. 21, 2012

(65) Prior Publication Data

US 2013/0246566 A1    Sep. 19, 2013

(30) Foreign Application Priority Data

Mar. 19, 2012 (JP) ................. 2012-062529

(51) Int. Cl.
G06F 15/16 (2006.01)
H04L 29/08 (2006.01)
H04L 29/06 (2006.01)

(52) U.S. Cl.
CPC ............... *H04L 67/32* (2013.01); *H04L 67/40* (2013.01)

(58) Field of Classification Search
USPC .................... 726/11; 718/1; 715/740
See application file for complete search history.

(56) References Cited

U.S. PATENT DOCUMENTS

| | | | |
|---|---|---|---|
| 2002/0055977 A1 | 5/2002 | Nishi | |
| 2003/0172308 A1* | 9/2003 | Imai | 713/201 |
| 2004/0139188 A1* | 7/2004 | Imai | 709/223 |
| 2006/0114498 A1* | 6/2006 | Yanagi et al. | 358/1.15 |
| 2006/0253505 A1* | 11/2006 | Natsume et al. | 707/203 |
| 2007/0009299 A1* | 1/2007 | Matsunaga | 400/62 |
| 2008/0170585 A1* | 7/2008 | Shoji et al. | 370/449 |
| 2009/0106418 A1 | 4/2009 | Imai | |
| 2012/0120439 A1* | 5/2012 | Minagawa | 358/1.15 |
| 2012/0133974 A1* | 5/2012 | Nakamura | 358/1.15 |
| 2012/0218595 A1* | 8/2012 | Miyazawa et al. | 358/1.15 |
| 2012/0311097 A1* | 12/2012 | Abe | 709/219 |
| 2012/0324096 A1* | 12/2012 | Barzel et al. | 709/224 |

FOREIGN PATENT DOCUMENTS

| | | |
|---|---|---|
| JP | A-2002-223483 | 8/2002 |
| JP | A-2003-330823 | 11/2003 |
| JP | A-2009-054171 | 3/2009 |

* cited by examiner

*Primary Examiner* — Brian J Gillis
*Assistant Examiner* — Kamran Mohammadi
(74) *Attorney, Agent, or Firm* — Oliff PLC

(57) ABSTRACT

An information processing apparatus includes a first receiving unit that receives, from a first information processing apparatus, a reservation process, which is a reservation for transmission of a process to be performed by a second information processing apparatus, a registration unit registering the reservation process received by the first receiving unit in a memory, a request unit that requests the first information processing apparatus to transmit the process to be performed by the second information processing apparatus when a communication is received from the second information processing apparatus and the reservation process is stored in the memory, a second receiving unit that receives the process to be performed by the second information processing apparatus transmitted from the first information processing apparatus in response to the request from the request unit, and a transmitting unit transmitting the process received by the second receiving unit to the second information processing apparatus.

10 Claims, 16 Drawing Sheets

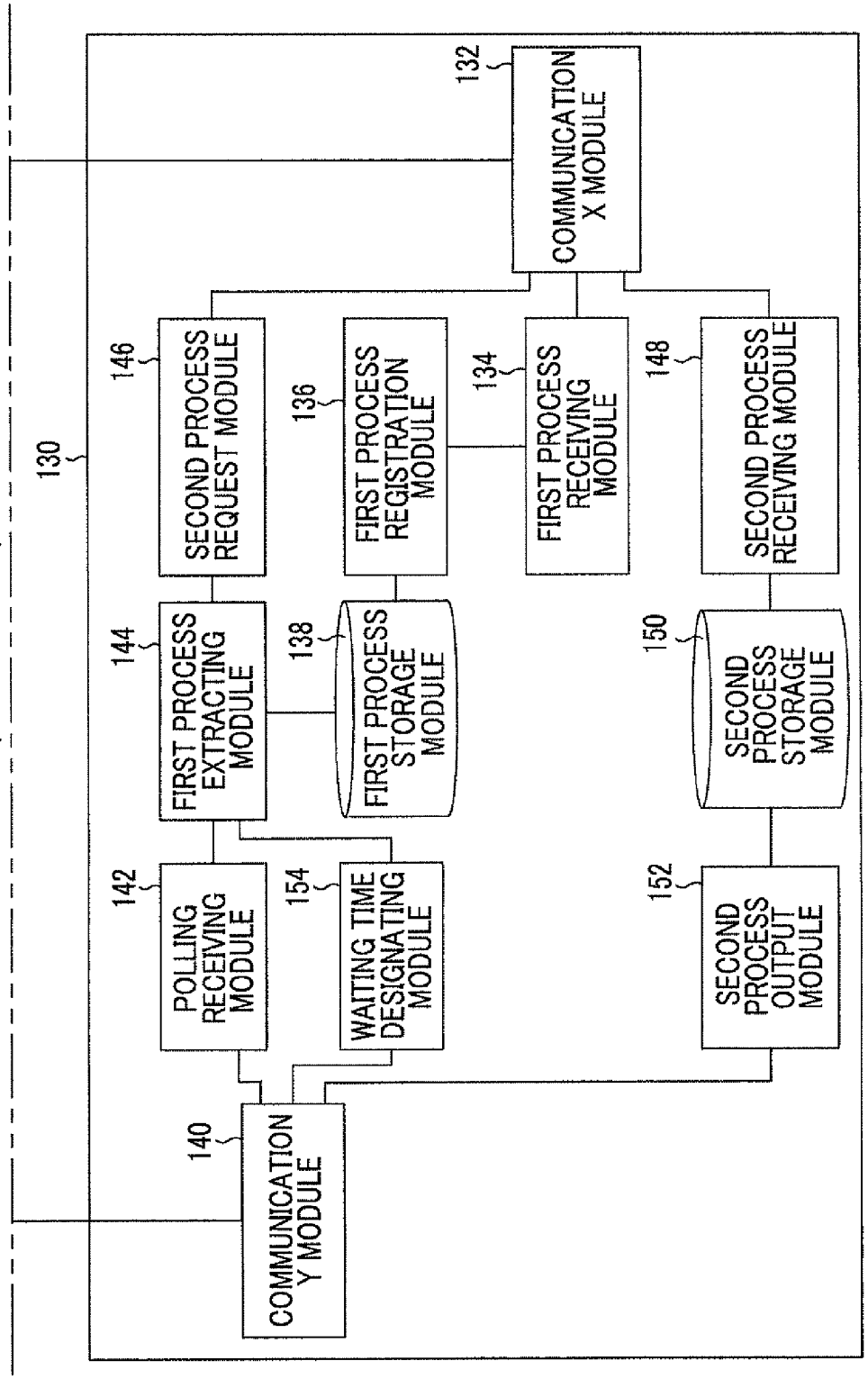
(FIG. 1 Continued)

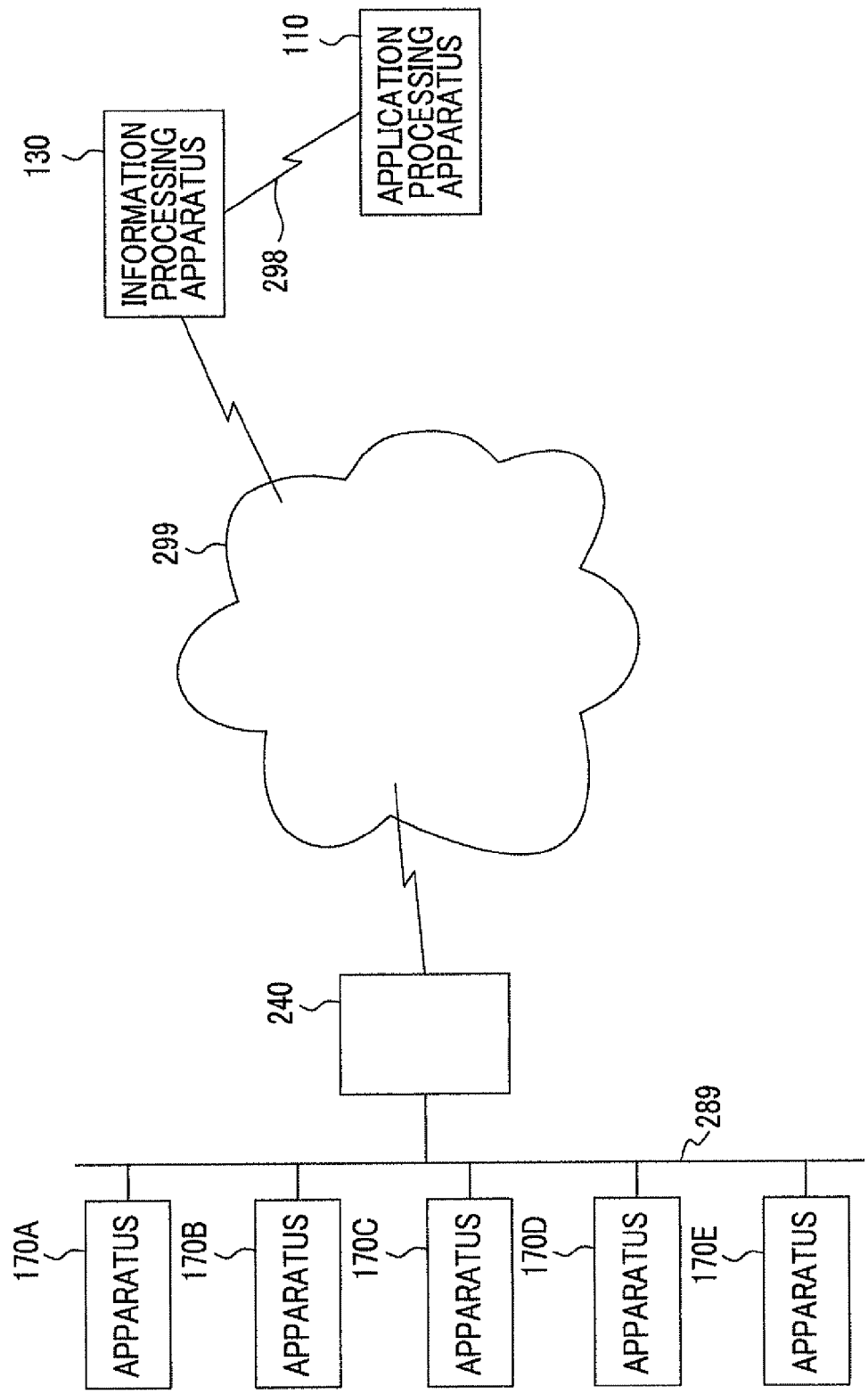

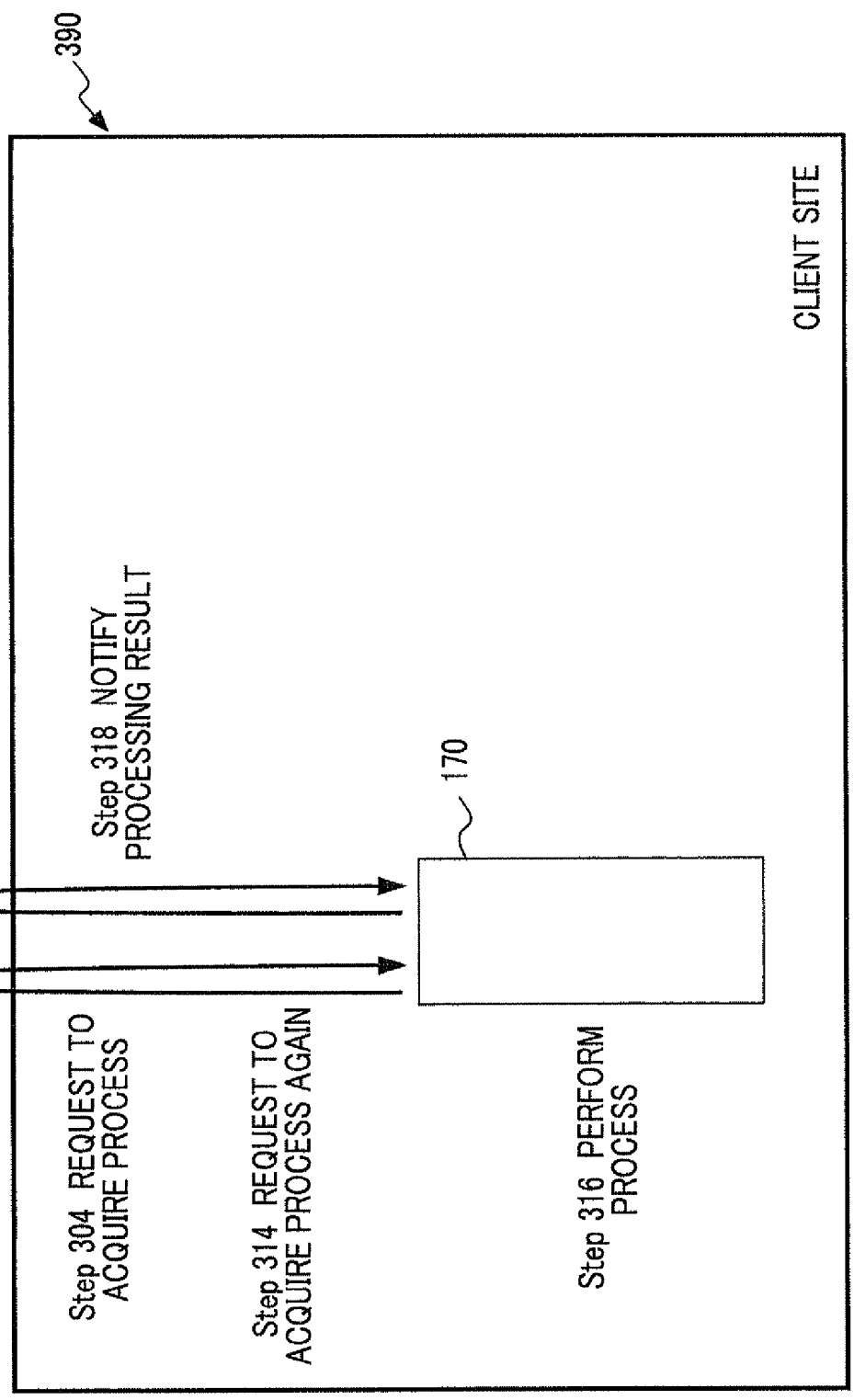

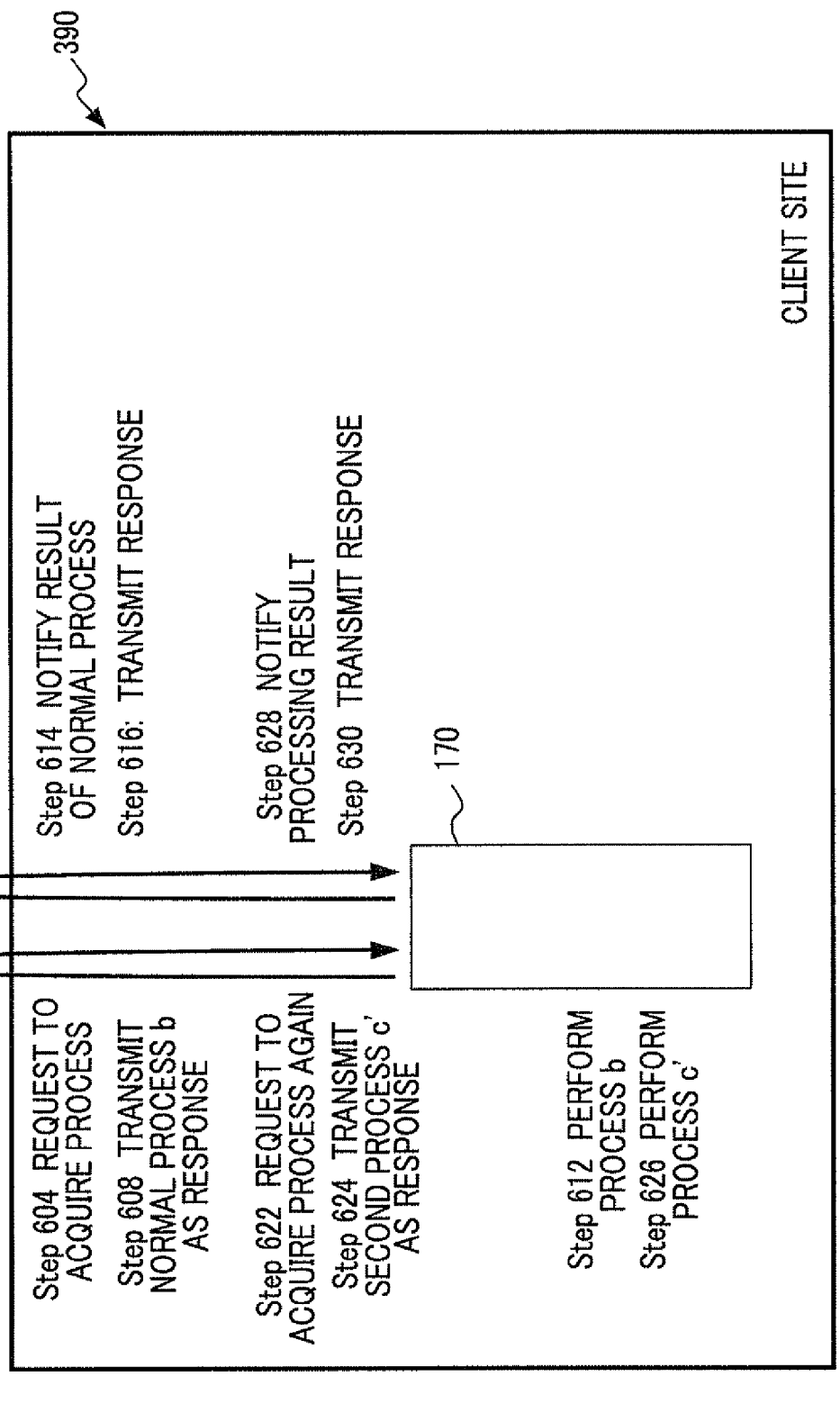

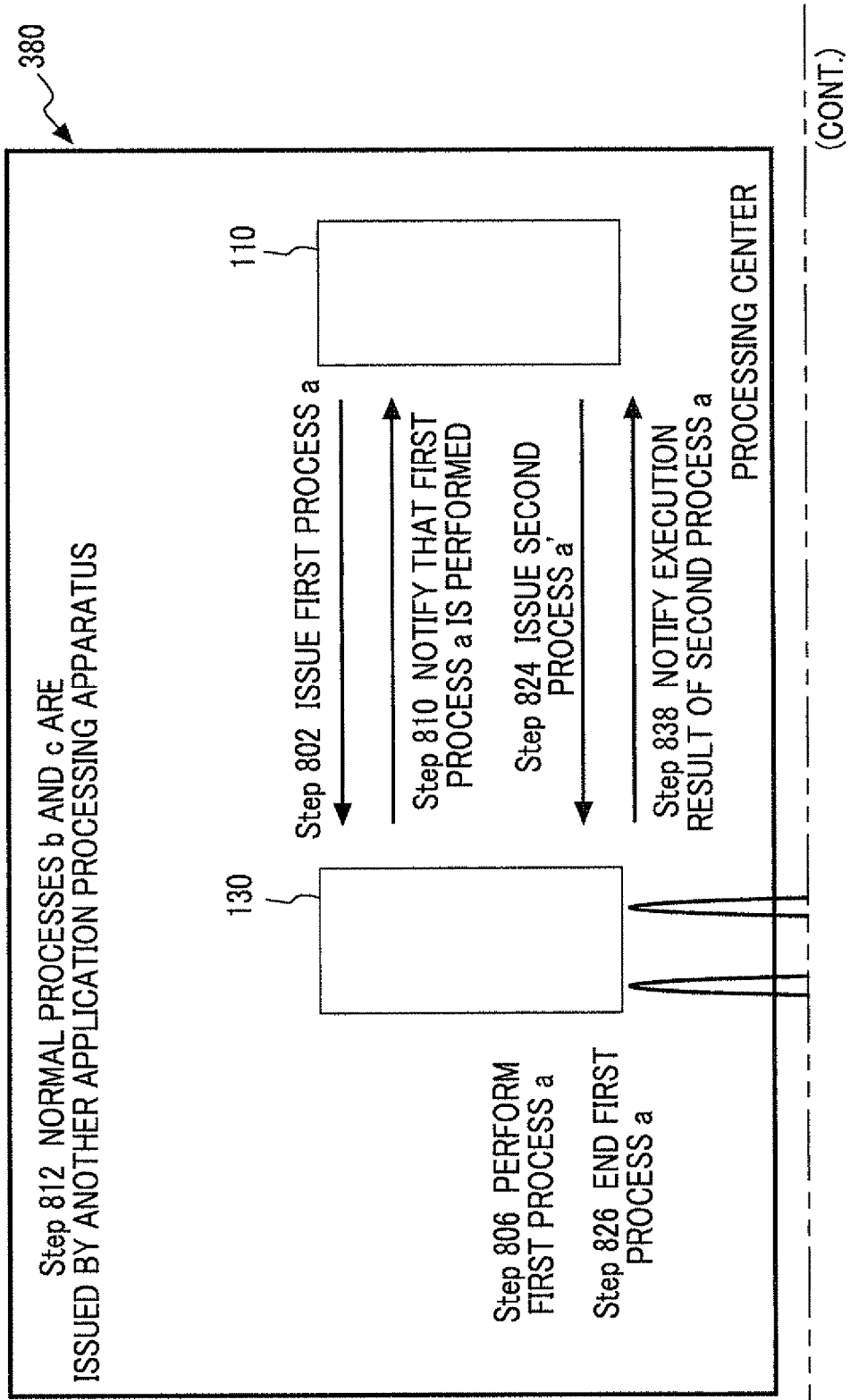

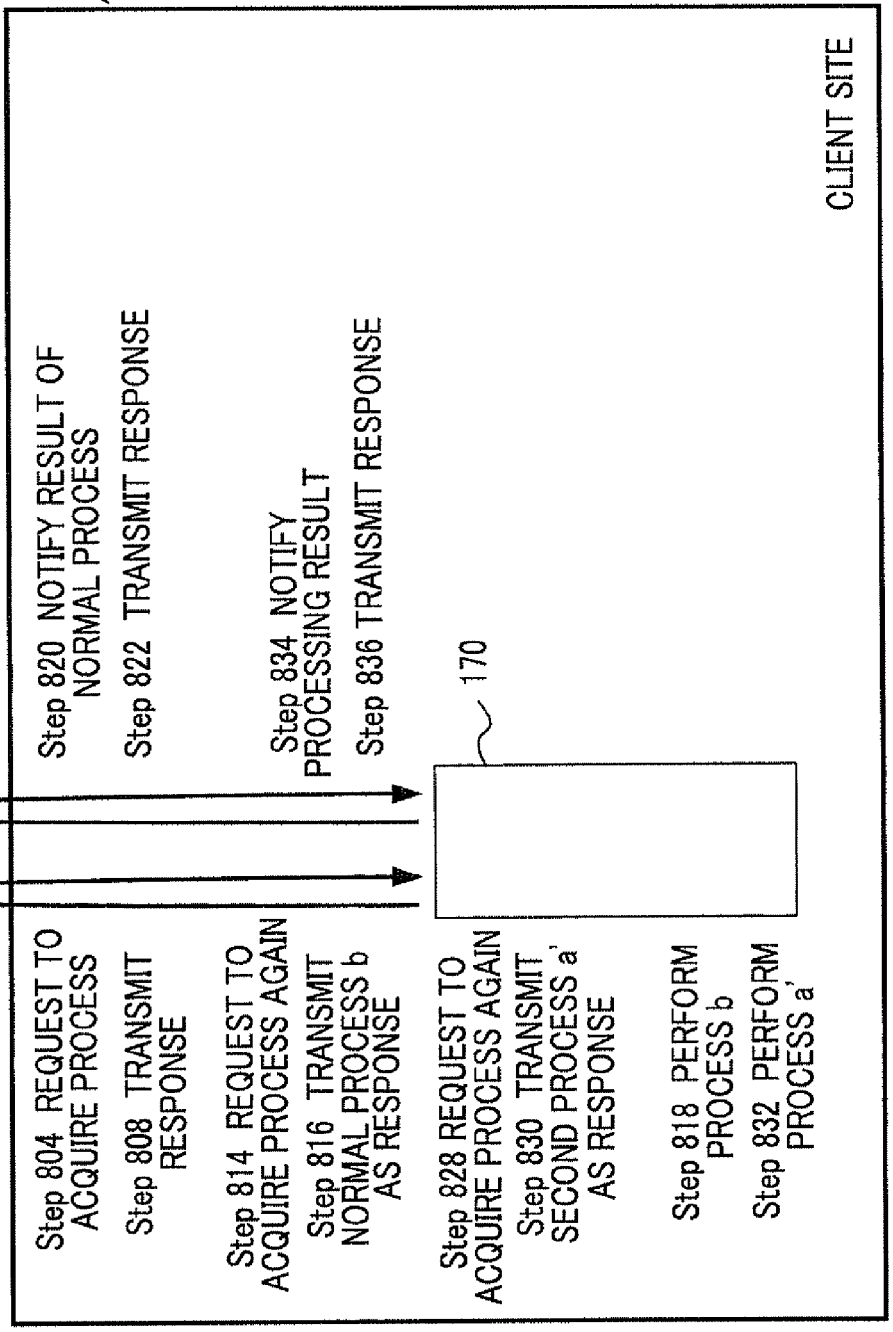

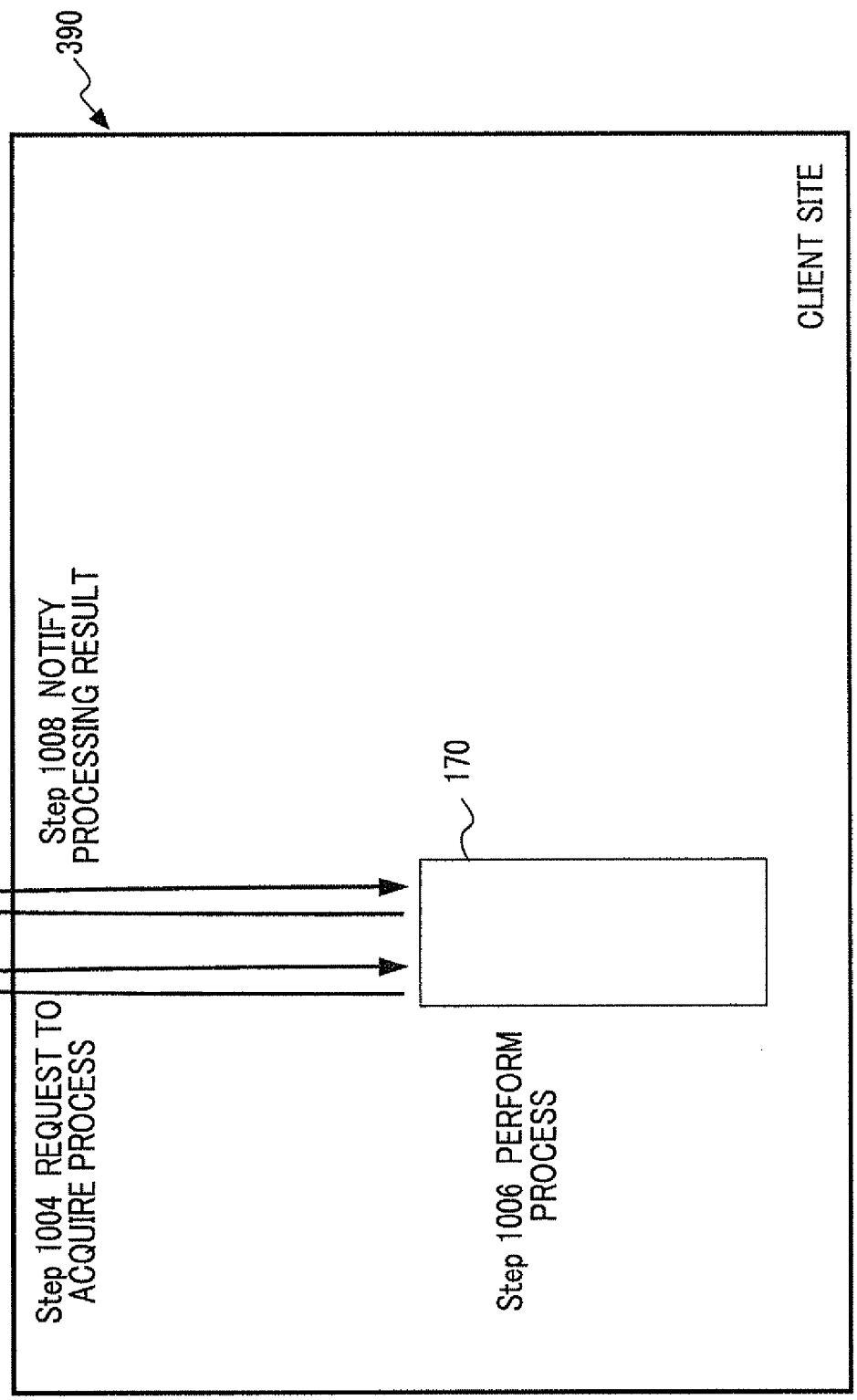

INFORMATION PROCESSING APPARATUS AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2012-062529 filed Mar. 19, 2012.

BACKGROUND

The present invention relates to an information processing apparatus and a non-transitory computer readable medium storing an information processing program.

SUMMARY

According to an aspect of the invention, there is provided an information processing apparatus including: a first receiving unit that receives, from a first information processing apparatus, a reservation process, which is a reservation for transmission of a process to be performed by a second information processing apparatus; a registration unit that registers the reservation process received by the first receiving unit in a memory; a request unit that requests the first information processing apparatus to transmit the process to be performed by the second information processing apparatus when a communication is received from the second information processing apparatus and the reservation process is stored in the memory; a second receiving unit that receives the process to be performed by the second information processing apparatus which is transmitted from the first information processing apparatus in response to the request from the request unit; and a transmitting unit that transmits the process received by the second receiving unit to the second information processing apparatus.

BRIEF DESCRIPTION OF THE DRAWINGS

Exemplary embodiments of the present invention will be described in detail based on the following figures, wherein:

FIG. 2 is a diagram illustrating an example of the structure of a system according to this exemplary embodiment;

FIG. 8 is a diagram illustrating an example of a process according to this exemplary embodiment;

DETAILED DESCRIPTION

Hereinafter, an exemplary embodiment of the invention will be described with reference to the accompanying drawings.

Figure 1:
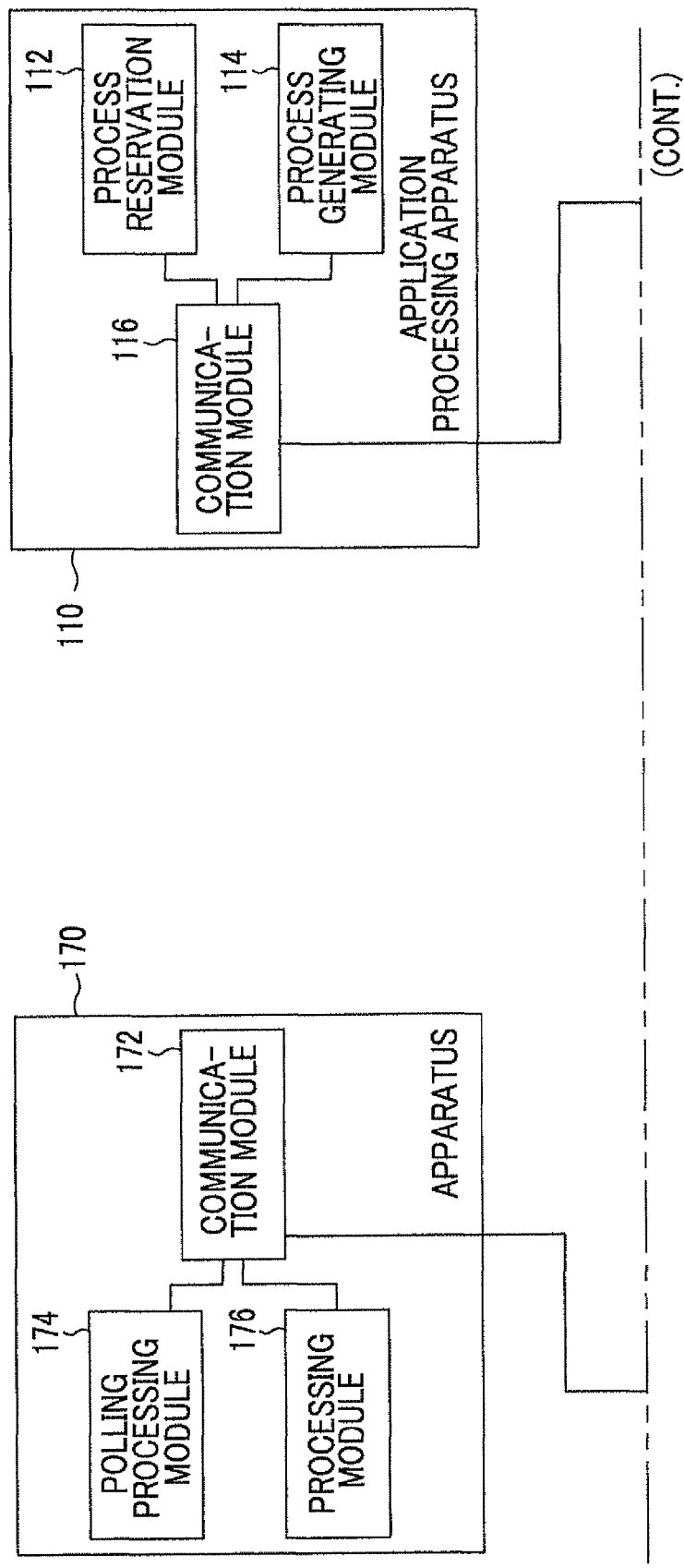
FIG. 1 is a conceptual module configuration diagram illustrating an example of a structure according to an exemplary embodiment.

FIG. 1 is a conceptual module configuration diagram illustrating an example of a structure according to this exemplary embodiment.

The term "module" refers generally to a component, such as logically separable software (computer program) and hardware. Therefore, a module in this exemplary embodiment indicates not only a module in a computer program but also a module in a hardware structure. Thus, this exemplary embodiment relates to a computer program (including a program which causes a computer to perform each process, a program which causes a computer to function as each unit, and a program which causes a computer to implement the functions of each unit) that causes a computer to function as modules, a system, and a method. For convenience of description, as used herein, "store," "be stored", or the equivalents thereof mean that a computer program is stored in a storage device or is controlled such that it is stored in a storage device when the exemplary embodiment relates to the computer program. The module may be in one-to-one correspondence with a function. When modules are mounted, one module may be configured as one program, plural modules may be formed by one program, or one module may be formed by plural programs. Plural modules may be implemented by one computer, or one module may be implemented by plural computers in distributed or parallel environments. One module may include other modules. Hereinafter, the term "connection" includes physical connection and logical connection (for example, the transmission and reception of data, instructions, and the reference relationship between data). The term "predetermined" refers to being decided prior to a target process. The term "predetermined" includes not only determination before a process according to the exemplary embodiment starts but also determination according to situations and conditions at that time or situations and conditions up to that time before a target process after the process according to the exemplary embodiment starts. When there are plural "predetermined values", the predetermined values may be different from each other or two or more values (of course, including all values) may be equal to each other. In addition, the sentence "when A is satisfied, B is performed" means that "if it is determined that A is satisfied, B is performed". However, a case in which it is not necessary to determine whether A is satisfied is excluded.

The term "system" or "apparatus" includes a structure including, for example, one computer, hardware, and a device and a structure in which, for example, plural computers, hardware, and devices are connected to each other by a communication unit, such as a network (including one-to-one correspondence communication connection). In the specification, "apparatus" is synonymous with "system." Of course, the "system" does not include anything that is merely a social "structure" (social system) that includes artificial decisions.

For each process by each module or each process when plural processes are performed in a module, target information is read from a storage device and is then processed and the process result is written to the storage device. Therefore, in some cases, the description of reading information from the storage device before the process and writing the process result to the storage device after the process is omitted. The storage device may include, for example, a hard disk, a Random Access Memory (RAM), an external storage medium, a storage device through a communication line, and a register in a Central Processing Unit (CPU).

As shown in FIG. 1, an information processing apparatus 130 according to this exemplary embodiment includes a communication X module 132, a first process receiving module 134, a first process registration module 136, a first process storage module 138, a communication Y module 140, a polling receiving module 142, a first process extracting module 144, a second process request module 146, a second process receiving module 148, a second process storage module 150, a second process output module 152, and a waiting time designating module 154. The information processing apparatus 130 is connected to an application processing apparatus 110 and an apparatus 170 through a communication line.

The information processing apparatus 130 receives the process to be performed by the apparatus 170 from the application processing apparatus 110 and transmits the process to the apparatus 170.

The apparatus 170 performs information processing including, for example, image processing and is, for example, an image processing apparatus (specifically, a copier, a facsimile machine, a scanner, a printer, or a multi-function machine (for example, an image processing apparatus with two or more functions of a scanner, a printer, a copier, and a facsimile machine)) or a Personal Computer (PC). Plural apparatuses 170 may be connected to the information processing apparatus 130.

Examples of the process to be performed by the apparatus 170 include a process for setting the power saving mode and a process of setting an address table of the facsimile machine and the process is also referred to as a job.

The application processing apparatus 110 generates the process to be performed by the apparatus 170, such as a process for setting the power saving mode or a process of setting the address table of the facsimile machine. Specifically, the application processing apparatus 110 corresponds to, for example, a program for performing the process or set data. In addition, plural application processing apparatuses 110 may be connected to the information processing apparatus 130.

The application processing apparatus 110 includes a process reservation module 112, a process generating module 114, and a communication module 116.

The process reservation module 112 is connected to the communication module 116. The process reservation module 112 transmits a reservation (reservation process) for the transmission of the process to be performed by the apparatus 170 to the information processing apparatus 130 through the communication module 116. The transmission of the reservation also corresponds to a generation reservation for generating the process to be performed by the apparatus 170. Specifically, the application processing apparatus 110 receives a notice indicating that the information processing apparatus 130 is ready to transmit the process. After the notice is received, the process generating module 114 generates the process.

That the information processing apparatus 130 is ready to transmit the process means that, for example, the information processing apparatus 130 receives a communication from the apparatus 170. Specifically, a firewall is provided between the information processing apparatus 130 and the apparatus 170 and communication (for example, the transmission of the process generated by the application processing apparatus 110) from the information processing apparatus 130 to the apparatus 170 is not always available. When the apparatus 170 communicates with the information processing apparatus 130, communication from the information processing apparatus 130 to the apparatus 170 is available as a response to the communication from the apparatus 170.

When a process is generated in advance and is then stored in the information processing apparatus 130 and the apparatus 170 communicates with the information processing apparatus 130, the process stored in the information processing apparatus 130 may be transmitted to the apparatus 170.

However, it is necessary to store the process in the information processing apparatus 130, but it is not preferable to store a process including, for example, individual information. In addition, the process generated by the application processing apparatus 110 is asynchronous with a process acquisition request from the apparatus 170 and it is likely to take a long time to transmit the process to the apparatus 170 after the process is generated. During that time, the process stored in the information processing apparatus 130 is outdated (the process does not include the latest information).

When the information processing apparatus 130 receives a communication from the apparatus 170, it notifies the application processing apparatus 110 of the reception of the communication and the process reservation module 112 reserves a process such that the process is generated in response to the notice.

The process reservation module 112 may transmit the time required to generate the process (the waiting time of the apparatus 170) to the information processing apparatus 130 through the communication module 116.

The process reservation module 112 may transmit information indicating whether to instruct the waiting time designating module 154 of the information processing apparatus 130 to designate the waiting time to the information processing apparatus 130 through the communication module 116.

The process generating module 114 is connected to the communication module 116. The process generating module 114 generates the process to be performed by the apparatus 170. The process generating module 114 generates the process at the time when a request to generate the "process to be performed by the apparatus 170" is received from the information processing apparatus 130 through the communication module 116. The generated "process to be performed by the apparatus 170" is transmitted through the communication module 116.

The communication module 116 is connected to the process reservation module 112, the process generating module 114, and the communication X module 132 of the information processing apparatus 130. The communication module 116 communicates with the information processing apparatus 130, transmits, for example, the reservation process to the information processing apparatus 130, receives the generated process from the information processing apparatus 130, and transmits the "process to be performed by the apparatus 170" to the information processing apparatus 130.

The communication X module 132 is connected to the first process receiving module 134, the second process request module 146, the second process receiving module 148, and the communication module 116 of the application processing apparatus 110. The communication X module 132 communicates with the application processing apparatus 110, transmits the content received from the application processing apparatus 110 to the first process receiving module 134 or the second process receiving module 148, and transmits the request from the second process request module 146 to the application processing apparatus 110.

The first process receiving module 134 is connected to the communication X module 132 and the first process registration module 136. The first process receiving module 134 receives the reservation process, which is a reservation for the transmission of the process to be performed by the apparatus 170, from the application processing apparatus 110 through the communication X module 132.

In addition, the first process receiving module 134 may receive the waiting time of the apparatus 170 from the application processing apparatus 110 through the communication X module 132. The waiting time may be included in the reservation process.

The first process receiving module 134 may receive information indicating whether to instruct the waiting time designating module 154 to designate the waiting time from the application processing apparatus 110 through the communication X module 132. The information indicating whether to instruct the waiting time designating module 154 to designate the waiting time may be included in the reservation process.

The first process registration module 136 is connected to the first process receiving module 134 and the first process storage module 138. The first process registration module 136 registers the reservation process received by the first process receiving module 134 in the first process storage module 138.

The first process storage module 138 is connected to the first process registration module 136 and the first process extracting module 144. The first process storage module 138 is accessed by the first process registration module 136 and the first process extracting module 144 and stores the reservation process received by the first process receiving module 134.

The communication Y module 140 is connected to the polling receiving module 142, the second process output module 152, the waiting time designating module 154, and the communication module 172 of the apparatus 170. The communication Y module 140 communicates with the apparatus 170, transmits the content received from the apparatus 170 to the polling receiving module 142, and transmits the "process to be performed by the apparatus 170" output from the second process output module 152 and the designation transmitted from the waiting time designating module 154 to the apparatus 170.

The polling receiving module 142 is connected to the communication Y module 140 and the first process extracting module 144. The polling receiving module 142 receives a communication from the apparatus 170 through the communication Y module 140. The communication is, for example, polling communication. The polling communication is generating a communication at a predetermined time interval, such as at an interval of one day or 12 hours. In addition, the content of the communication is, for example, a process acquisition request or a notice indicating the state of the apparatus 170. Any communication other than the polling communication may be used as long as it may be received from the apparatus 170. For example, an urgent communication indicating a failure may be received from the apparatus 170.

The first process extracting module 144 is connected to the first process storage module 138, the polling receiving module 142, the second process request module 146, and the waiting time designating module 154. The first process extracting module 144 extracts the reservation process from the first process storage module 138.

The second process request module 146 is connected to the communication X module 132 and the first process extracting module 144. When a communication is received from the apparatus 170 and the reservation process is stored in the first process storage module 138, the second process request module 146 requests the application processing apparatus 110 to transmit the "process to be performed by the apparatus 170" through the communication X module 132. The term "when a communication is received from the apparatus 170" means when the polling receiving module 142 receives a polling communication through the communication Y module 140. The term "when the reservation process is stored in the first process storage module 138 means when the first process extracting module 144 extracts the reservation process from the first process storage module 138.

The second process receiving module 148 is connected to the communication X module 132 and the second process storage module 150. The second process receiving module 148 receives the "process to be performed by the apparatus 170" from the application processing apparatus 110 through the communication X module 132 in response to the request from the second process request module 146. For example, the "process to be performed by the apparatus 170" received from the application processing apparatus 110 may be stored in the second process storage module 150 or directly transmitted to the second process output module 152.

The second process storage module 150 is connected to the second process receiving module 148 and the second process output module 152. The second process storage module 150 is accessed by the second process receiving module 148 and the second process output module 152 and stores the "process to be performed by the apparatus 170".

The second process output module 152 is connected to the communication Y module 140 and the second process storage module 150. The second process output module 152 transmits the process received by the second process receiving module 148 to the apparatus 170 through the communication Y module 140. For example, the second process output module 152 may transmit the "process to be performed by the apparatus 170" received by the second process receiving module 148 or the "process to be performed by the apparatus 170" stored in the second process storage module 150.

When a communication is received from the apparatus 170 after the waiting time, the second process output module 152 may transmit the process received by the second process receiving module 148 to the apparatus 170.

When a communication is received from the apparatus 170 and there is a process to be transmitted to the apparatus 170, the second process output module 152 may transmit the process to the apparatus 170.

When the waiting time received by the first process receiving module 134 is equal to or less than a predetermined time, the second process output module 152 may transmit the process received by the second process receiving module 148 to the apparatus 170 without performing the designation by the waiting time designating module 154.

In addition, when the information received by the first process receiving module 134 indicates that the designation by the waiting time designating module 154 is not performed, the second process output module 152 may transmit the process received by the second process receiving module 148 to the apparatus 170, without performing the designation by the waiting time designating module 154.

The waiting time designating module 154 is connected to the communication Y module 140 and the first process extracting module 144. When a communication is received from the apparatus 170 and the reservation process is stored in the first process storage module 138, the waiting time designating module 154 designates communication from the apparatus 170 to the information processing apparatus 130 after the waiting time received by the first process receiving module 134 has elapsed. The designation is transmitted to the apparatus 170 through the communication Y module 140. The "communication from the apparatus 170" is a communication (for example, polling communication) transmitted from the apparatus 170 through the communication Y module 140. The term "when the reservation process is stored in the first process storage module 138" means when the first process extracting module 144 extracts the reservation process from the first process storage module 138.

The apparatus 170 includes a communication module 172, a polling processing module 174, and a processing module 176.

The communication module 172 is connected to the polling processing module 174, the processing module 176, and the communication Y module 140 of the information processing apparatus 130. The communication module 172 communicates with the information processing apparatus 130, performs polling communication with the information processing apparatus 130 which is performed by the polling processing module 174 to the apparatus 170, and transmits the process received from the apparatus 170 to the processing module 176.

The polling processing module 174 is connected to the communication module 172. The polling processing module 174 performs, for example, polling communication with the information processing apparatus 130 through the communication module 172.

The processing module 176 is connected to the communication module 172. The processing module 176 receives the "process to be performed by the apparatus 170" from the information processing apparatus 130 through the communication module 172.

FIG. 2 is a diagram illustrating an example of the structure of a system according to this exemplary embodiment.

The application processing apparatus 110 is connected to the information processing apparatus 130 through a communication line 298. The information processing apparatus 130 is connected to the application processing apparatus 110 through the communication line 298 and is connected to a communication processing apparatus (firewall) 240 through a communication line 299. The communication processing apparatus (firewall) 240 is connected to the information processing apparatus 130 through the communication line 299 and is connected to an apparatus 170A, an apparatus 170B, an apparatus 170C, an apparatus 170D, and an apparatus 170E through a company's internal communication line 289. The apparatuses 170A to 170E and the communication processing apparatus (firewall) 240 are connected to each other through the company's internal communication line 289.

The information processing apparatus 130 is a server that manages the apparatuses 170A to 170E, is provided in a center which manages, for example, the apparatus 170, and performs a process of transmitting a message (process) between the apparatus 170 and the application processing apparatus 110. The information processing apparatus 130 manages the process received from the application processing apparatus 110 with a queue. When there is an acquisition request from the apparatus 170, the information processing apparatus 130 transmits the process in the queue. When receiving a notice indicating the processing result of the process from the apparatus 170, the information processing apparatus 130 may transmit the processing result to the application processing apparatus 110.

The application processing apparatus 110 is a server that manages the processes to be performed by the apparatuses 170A to 170E, is provided in the center which manages, for example, the apparatus 170, and performs a business process. The application processing apparatus 110 generates the process (for example, various settings) to be performed by the apparatus 170 and transmits the generated process to the information processing apparatus 130. The application processing apparatus 110 may receive the processing result of the process from the information processing apparatus 130.

The apparatus 170 is, for example, a device (an information processing apparatus such as an image processing apparatus) in a client site and periodically (for example, once a day) transmits a process acquisition request to the information processing apparatus 130. The apparatus 170 performs the received process and notifies the information processing apparatus 130 of the processing result. In addition, since the company's internal communication line 289 and the apparatus 170 are provided in the client site, they are protected by the firewall function of the communication processing apparatus (firewall) 240. Specifically, communication from the apparatus 170 to the information processing apparatus 130 is available, but communication from the information processing apparatus 130 to the apparatus 170 is not available at any time. Therefore, only when a communication is received from the information processing apparatus 130, communication from the information processing apparatus 130 to the apparatus 170 is available as a response to the communication.

The outline of the process of the system will be described.

The process is generated in two stages.

First Stage (Reservation Process)

The application processing apparatus 110 generates a process to indicate readiness for process generation, and registers the process in the information processing apparatus 130 (hereinafter, referred to as a first process).

When the apparatus 170 performs communication with the information processing apparatus 130, the information processing apparatus 130 transmits a response indicating that the apparatus 170 performs communication again after a predetermined time and transmits a notice to the application processing apparatus 110 which has generated the first process.

Second Stage (Transmission of Substantial Process)

When receiving the notice, the application processing apparatus 110 generates the original process (the process to be performed by the apparatus 170) and registers the generated process in the information processing apparatus 130 (hereinafter, referred to as a second process). When the apparatus 170 performs communication with the information processing apparatus 130 again, the information processing apparatus 130 transmits the second process to the apparatus 170.

Figure 3:
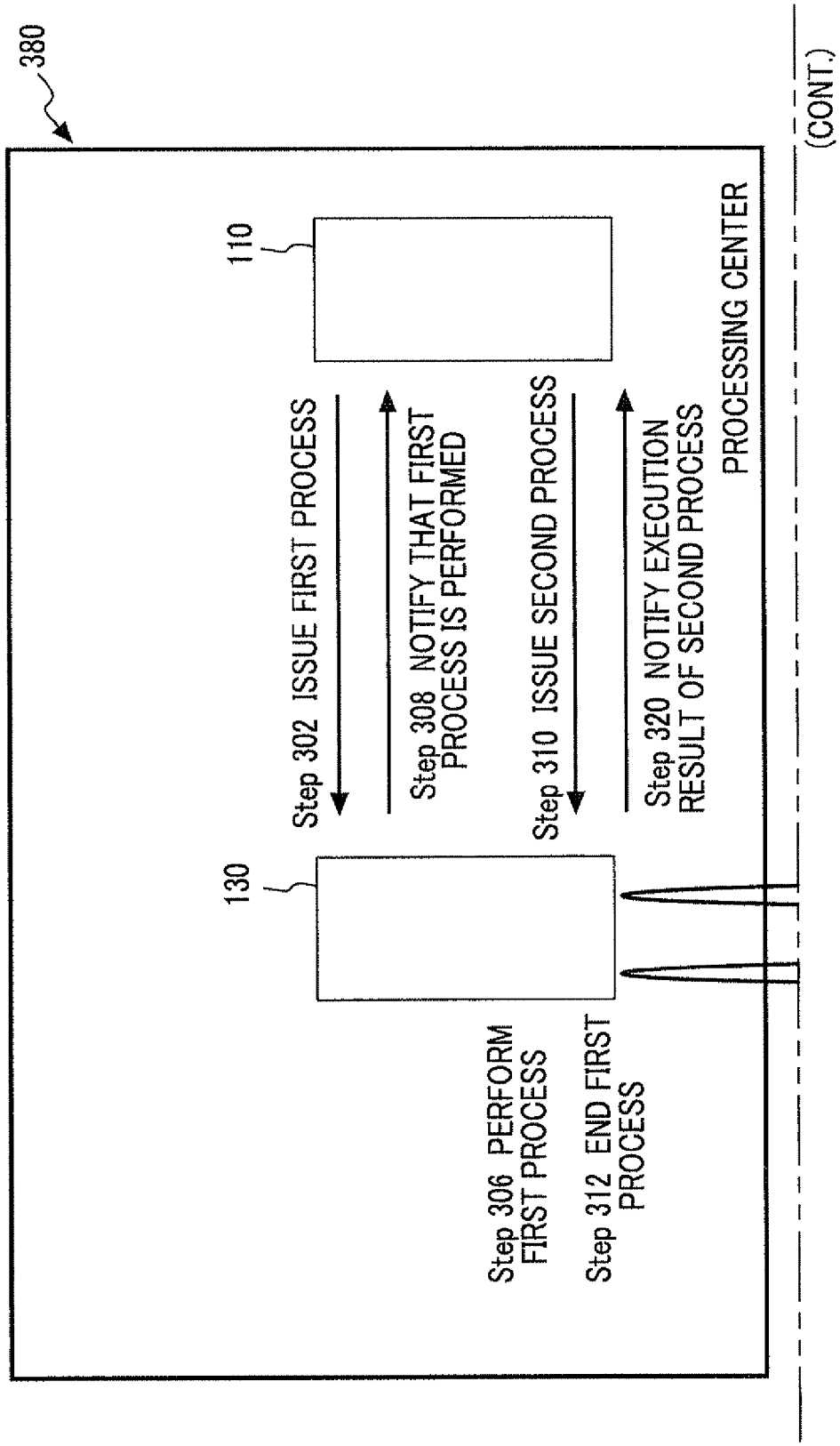
FIG. 3 is a diagram illustrating an example of a process according to this exemplary embodiment.

FIG. 3 is a diagram illustrating an example of a process according to this exemplary embodiment. The application processing apparatus 110 and the information processing apparatus 130 are provided in a processing center 380 and the apparatus 170 is provided in a client site 390.

In Step 302, the application processing apparatus 110 issues the first process to the information processing apparatus 130. The first process may include polling interval information as the waiting time of the apparatus 170. The polling interval information is used as the value of NextHint (waiting time variable) which is designated when the information processing apparatus 130 responds to the apparatus 170 in Step 304. The first process does not include the process to be performed by the apparatus 170. The validity period (the period for which the first process is retained in the information processing apparatus 130) of the first process may be determined. For example, the validity period may be several days.

Figure 5:
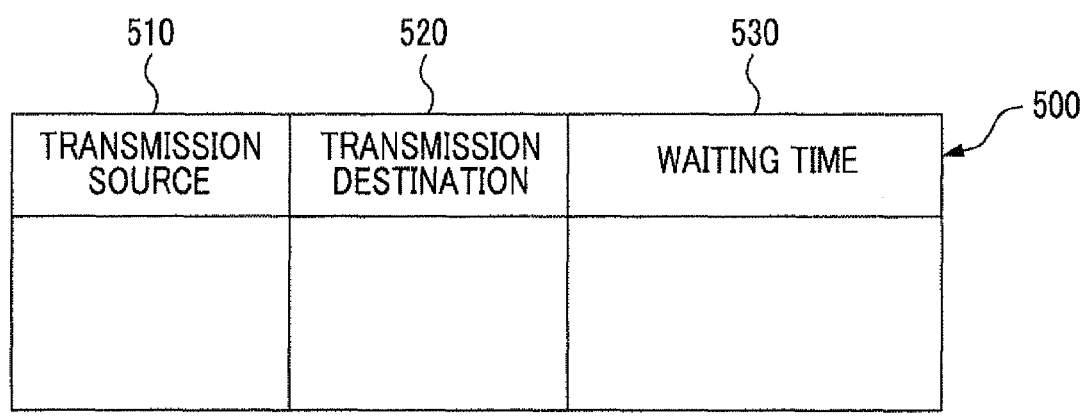
FIG. 5 is a diagram illustrating an example of the data structure of a process table.

The content of the first process may be, for example, a process table 500. FIG. 5 is a diagram illustrating an example of the data structure of the process table 500. The process table 500 includes a transmission source field 510, a transmission destination field 520, and awaiting time field 530. The transmission source field 510 stores the application processing apparatus 110 which transmits the first process. The transmission destination field 520 stores the apparatus 170 which performs the second process. The waiting time field 530 stores the value of NextHint (waiting time variable).

In Step 304, the apparatus 170 requests the information processing apparatus 130 to acquire the process using, for example, polling communication.

In Step 306, the information processing apparatus 130 performs the first process.

The first process is "being performed" in a stage in which the apparatus 170 transmits a job acquisition request to the information processing apparatus 130 in Step 304. The first process is a special job (job performed by the information processing apparatus 130) and is not transmitted to the apparatus 170. The first process "ends" at the time when the information processing apparatus 130 receives the second process issued by the application processing apparatus 110. When the information processing apparatus 130 transmits a response to the apparatus 170 (Step 304), the polling interval information is transmitted as the value of NextHint. The apparatus 170 waits for NextHint (polling interval information) and transmits the job acquisition request again.

In Step 308, the information processing apparatus 130 notifies the application processing apparatus 110 that the first process is being performed.

In Step 310, the application processing apparatus 110 issues the second process to the information processing apparatus 130.

When receiving a notice indicating that the first process is being performed from the information processing apparatus 130, the application processing apparatus 110 generates and issues the second process. The second process includes information to be processed by the apparatus 170. For example, the second process may include individual information, such as an address table setting process. The validity period (the period for which the second process is retained in the information processing apparatus 130) of the second process may be determined. For example, a short validity period may be set on the assumption that the second process is instantly consumed (the second process is transmitted to the apparatus 170). For example, the validity period may be set to about several minutes.

In Step 312, since the information processing apparatus 130 receives the second process issued by the application processing apparatus 110, it ends the first process.

In Step 314, the apparatus 170 transmits the process acquisition request to the information processing apparatus 130 again. The information processing apparatus 130 transmits the second process to the apparatus 170 as a response to the request.

In Step 316, the apparatus 170 performs the process (second process).

In Step 318, the apparatus 170 notifies the information processing apparatus 130 of the processing result.

In Step 320, the information processing apparatus 130 notifies the application processing apparatus 110 of the execution result of the second process.

Figure 4:
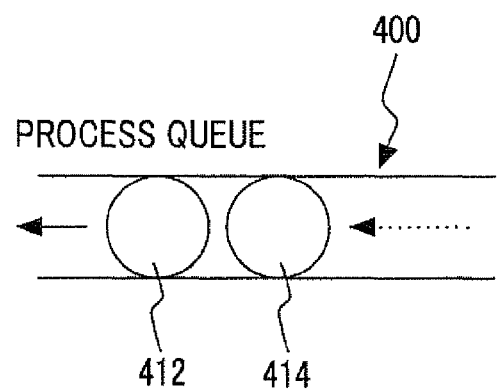
FIG. 4 is a diagram illustrating an example of a process queue in the example of the process according to this exemplary embodiment.

FIG. 4 is a diagram illustrating an example of a process queue in the example of the process according to this exemplary embodiment. FIG. 4 shows an aspect in which a process queue 400 includes a process 412 and a process 414. In the process shown in FIG. 3, since the process is sequentially performed, the process queue 400 includes the process 412 and the process 414 and the process 412 and the process 414 are processed in this order.

The process shown in FIG. 3 may be performed as follows (modification of FIG. 3). That is, when it takes no time for the application processing apparatus 110 to generate the process, the apparatus 170 is kept in a standby state without setting the waiting time of the apparatus 170.

In Step 302, the process reservation module 112 instructs the waiting time designating module 154 not to perform designation (waiting). Alternatively, the process reservation module 112 sets the waiting time (NextHint) to a sufficiently small value (a value that is sufficiently small for the information processing apparatus 130 to determine that the designation by the waiting time designating module 154 is not performed).

In Step 304, even when the apparatus 170 transmits a process acquisition request to the information processing apparatus 130 using, for example, polling communication, the information processing apparatus 130 does not instantly respond to the apparatus 170 and waits until Step 312 (until the information processing apparatus 130 receives the second process from the application processing apparatus 110). That is, there is no response to the process acquisition request in Step 304 and the apparatus 170 waits for the response (in the above-mentioned example, there is a response to NextHint and the apparatus 170 waits for the time NextHint and transmits the process acquisition request again in Step 314).

Then, in Step 314, the information processing apparatus 130 transmits, to the apparatus 170, the second process received from the application processing apparatus 110 as a response to Step 304.

In some cases, the apparatus 170 transmits the acquisition request to the information processing apparatus 130 again while the first process is being performed. In this case, the information processing apparatus 130 may keep the apparatus 170 waiting. In addition, the information processing apparatus 130 may designate NextHint and transmit a response indicating that there is no second process. At that time, the elapsed time may be subtracted from NextHint to be designated such that NextHint may be designated to be shorter than the original NextHint (NextHint designated in Step 304 of FIG. 3).

When the time required to generate the second process is different from the expected time (it is determined that it takes a long time to generate the second process) during the generation of the second process, the application processing apparatus 110 may notify the information processing apparatus 130 of a new expected time. When the process acquisition request in Step 314 is received from the apparatus 170 again before the second process, the information processing apparatus 130 receiving the notice may designate the new expected time as NextHint.

Figure 6:
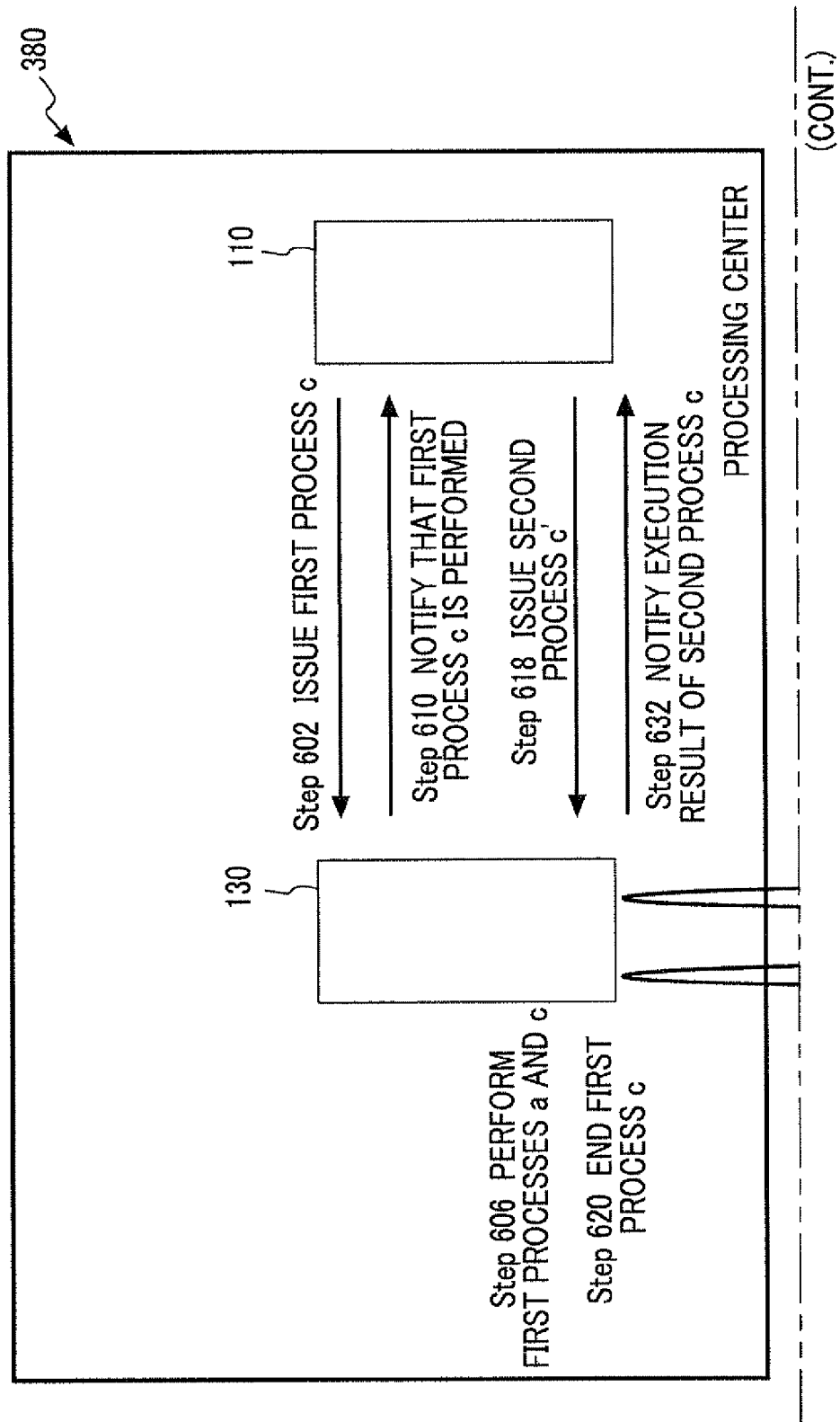
FIG. 6 is a diagram illustrating an example of a process according to this exemplary embodiment.

FIG. 6 is a diagram illustrating an example of a process according to this exemplary embodiment. FIG. 6 shows a case in which another process (normal process) is included in the process queue.

Figure 10:
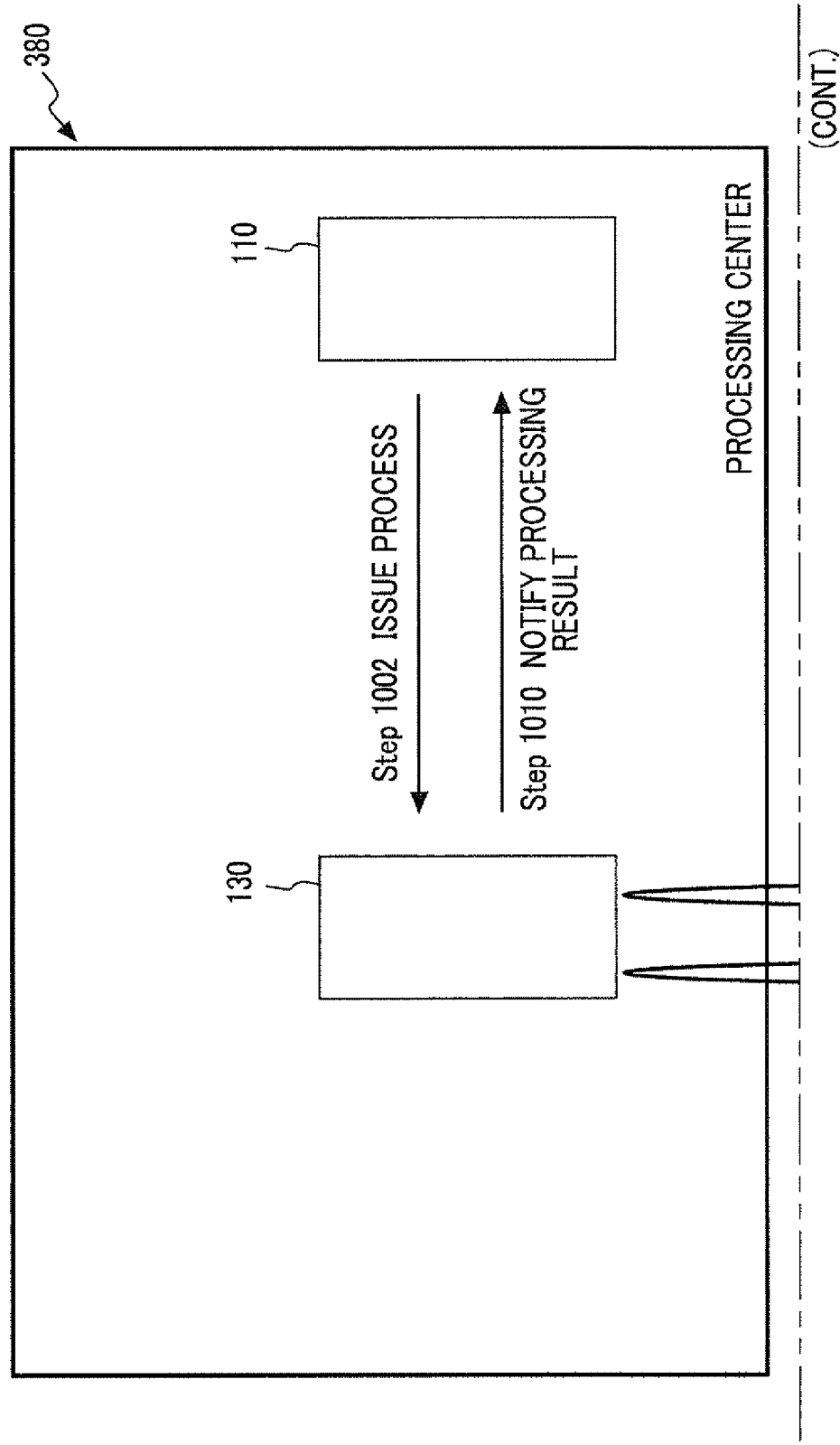
FIG. 10 is a diagram illustrating an example of a process according to this exemplary embodiment.

Before an example of the process shown in FIG. 6 is described, an example of a process for transmitting another process (normal process) from the application processing apparatus 110 to the apparatus 170 through the information processing apparatus 130 will be described with reference to FIG. 10. FIG. 10 is a diagram illustrating an example of the process according to this exemplary embodiment.

In Step 1002, the application processing apparatus 110 issues a process (normal process) to the information processing apparatus 130.

In Step 1004, the apparatus 170 transmits a process acquisition request to the information processing apparatus 130.

In Step 1006, the apparatus 170 performs the process (normal process).

In Step 1008, the apparatus 170 notifies the information processing apparatus 130 of the processing result.

In Step 1010, the information processing apparatus 130 notifies the application processing apparatus 110 of the result of a job.

In the example of the process shown in FIG. 10, the above-mentioned two-stage process is not performed, but the process (normal process) generated by the application processing apparatus 110 is stored in the information processing apparatus 130 and is transmitted to the apparatus 170 after a communication is received from the apparatus 170.

Since the apparatus 170 does not detect the time when a process is issued, it is likely to take a long time from Step 1002 to Step 1004. For example, when the apparatus 170 performs Step 1004 once a day and Step 1004 is performed immediately before Step 1002, it takes a day to perform the process from Step 1002 to the next Step 1004. For example, in some cases, the time required to perform the process is one or more days due to, for example, the failure of the apparatus 170, power-off, and a network failure.

In Step 1008, the information processing apparatus 130 may set NextHint to the apparatus 170. That is, when the information processing apparatus 130 wants to perform Step 1004 on the apparatus 170 again (for example, since there are plural normal processes in the process queue of the information processing apparatus 130, only one execution of Step 1004 is insufficient to transmit all normal processes to the apparatus 170), the information processing apparatus 130 designates a value equal to or more than 0 and transmits the value as a response. The value 0 means that the processing result is instantly transmitted and the value greater than 0 means that the processing result is transmitted after the designated time. When NextHint is not designated, the apparatus 170 does not perform Step 1004 any longer (for example, the apparatus 170 does not perform Step 1004 until the fixed time the next day).

The example of the process shown in FIG. 6 is a combination of the example of the process shown in FIG. 3 and the example of the process shown in FIG. 10.

In the example of the process shown in FIG. 6, another process is included in the process queue in Step 304 of the example of the process shown in FIG. 3.

(1) Basically, the processes are sequentially (in the order registered) transmitted to the apparatus 170 from the top. The first process is not transmitted to the apparatus 170 and there is no second process at that time. Therefore, when there is another process in the process queue, the process is transmitted to the apparatus 170. In this case, since the apparatus 170 notifies the processing result, the designation of NextHint is not needed at this time (Step 608).

When the next process is also the first process, similarly, the process is being performed. When there is a process after the next process, the process is transmitted to the apparatus 170 (The same shall apply hereinafter).

When there is no another process in the process queue, NextHint is designated (on the basis of the polling interval information described in the first process) and a response indicating that there is no process to be transmitted to the apparatus 170 is transmitted.

(2) When there are plural first processes which are being performed.

In the first processes which are being performed, the shortest waiting time (polling interval) is used as the value of NextHint.

Figure 7:
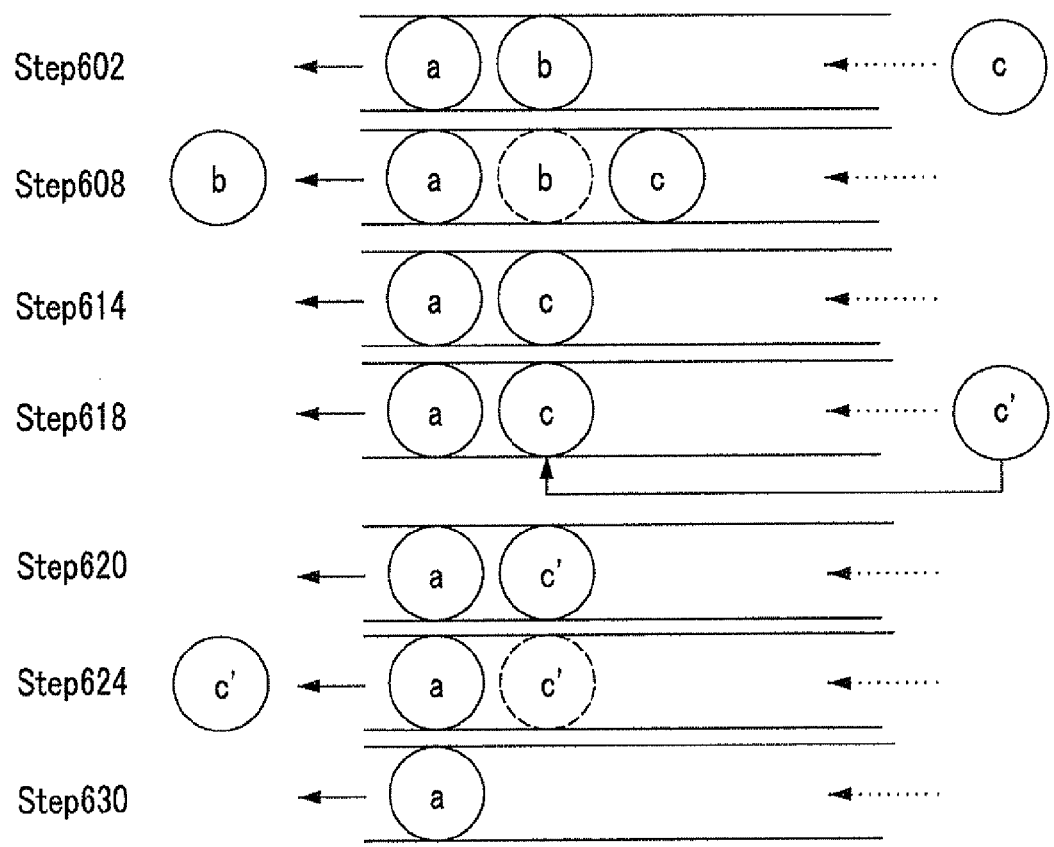
FIG. 7 is a diagram illustrating an example of a process queue in the example of the process according to this exemplary embodiment.

As an initial state, it is assumed that another application processing apparatus 110 has issued a first process a (NextHint (waiting time variable) is y) and a normal process b (that is, in a state in which the normal process b is stored in the information processing apparatus 130, but has not been processed (that is, the normal process b is not transmitted to the apparatus 170)) (see Step 602 in FIG. 7).

In Step 602, the application processing apparatus 110 issues a first process c to the information processing apparatus 130 (see Step 602 in FIG. 7). It is assumed that NextHint (waiting time variable) is x.

In Step 604, the apparatus 170 issues a process acquisition request to the information processing apparatus 130.

In Step 606, the information processing apparatus 130 performs the first processes a and c.

In Step 608, the information processing apparatus 130 transmits the normal process b as a response to the apparatus 170. That is, the information processing apparatus 130 transmits the normal process b to the apparatus 170 (see Step 608 in FIG. 7).

In Step 610, the information processing apparatus 130 notifies the application processing apparatus 110 of the execution of the first process c. In addition, the information processing apparatus 130 notifies the application processing apparatus 110 which has issued the first process a of the execution of the first process a.

In Step 612, the apparatus 170 performs the process b.

In Step 614, the apparatus 170 notifies the information processing apparatus 130 of the processing result of the normal process b (see Step 614 in FIG. 7).

In Step 616, the information processing apparatus 130 transmits a response to the apparatus 170. The response includes min(x, y) (a function for extracting the smaller of x and y) indicating NextHint (waiting time variable).

In Step 618, the application processing apparatus 110 issues a second process c" (the second process c" is used for distinction from the first process c in FIG. 7 and is the same as a second process c) to the information processing apparatus 130 (see Step 618 in FIG. 7). The second process c' corresponds to the first process c.

In Step 620, the information processing apparatus 130 ends the first process c (see Step 620 in FIG. 7).

In Step 622, the apparatus 170 issues the process acquisition request to the information processing apparatus 130 again.

In Step 624, the information processing apparatus 130 transmits a response to the apparatus 170 (see Step 624 in FIG. 7). That is, the information processing apparatus 130 transmits the second process c' to the apparatus 170.

In Step 626, the apparatus 170 performs the second process c' (second process c).

In Step 628, the apparatus 170 notifies the information processing apparatus 130 of the processing result.

In Step 630, the information processing apparatus 130 transmits a response to the apparatus 170 (see Step 630 in FIG. 7). The response includes NextHint (waiting time variable) set to y.

In Step 632, the information processing apparatus 130 notifies the application processing apparatus 110 of the execution result of the second process c.

FIG. 8 is a diagram illustrating an example of a process according to this exemplary embodiment. The example of the process shown in FIG. 8 is a combination of the example of the process shown in FIG. 3 and the example of the process shown in FIG. 10. In particular, FIG. 8 shows an example in which the apparatus 170 issues the acquisition request again while the first process is being performed.

(3) In a case in which the process acquisition request is transmitted from the apparatus 170 again while the first process is being performed, similarly to (1) in the description of the example of the process shown in FIG. 6, when another normal process is included in the process queue, it is transmitted to the apparatus 170. When only the first process which is being performed is included in the process queue, NextHint is designated (on the basis of the polling interval information described in the first process) and a response indicating that there is no process is transmitted to the apparatus 170. When there is another first process in the process queue, it is performed. When the next process is a normal process, it is transmitted to the apparatus 170 (the same shall apply hereinafter).

In Step 802, the application processing apparatus 110 issues a first process a to the information processing apparatus 130. It is assumed that NextHint (waiting time variable) is x (see Step 802 in FIG. 9).

In Step 804, the apparatus 170 transmits a process acquisition request to the information processing apparatus 130.

In Step 806, the information processing apparatus 130 performs the first process a.

In Step 808, the information processing apparatus 130 transmits a response to the apparatus 170. The response includes NextHint set to x.

In Step 810, the information processing apparatus 130 notifies the application processing apparatus 110 of the execution of the first process a.

Figure 9:
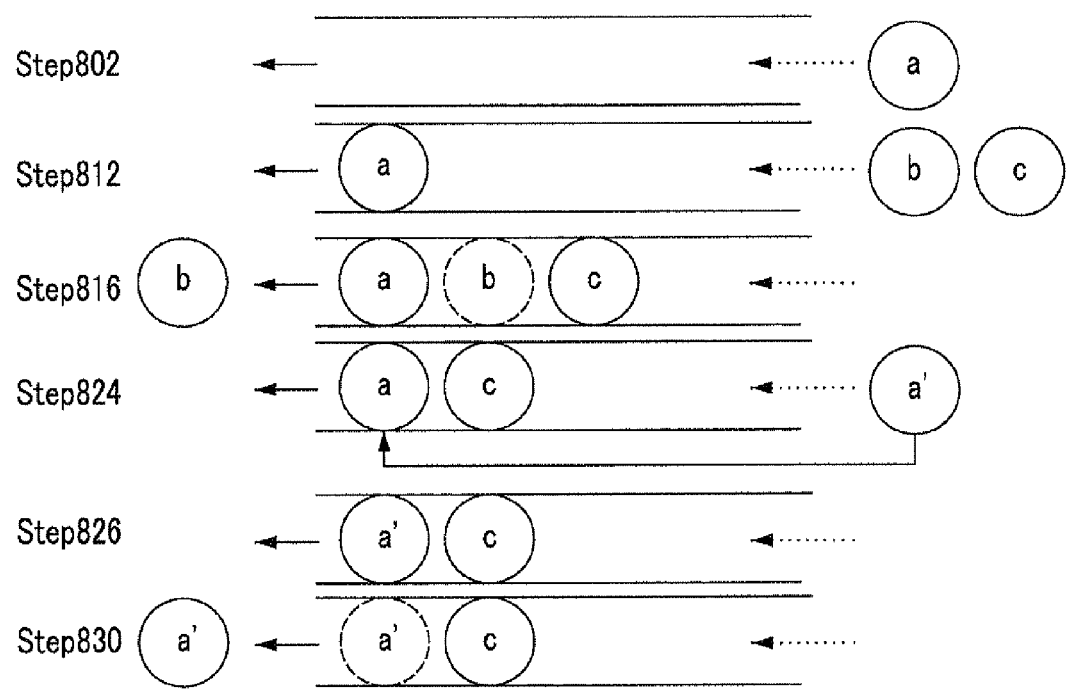
FIG. 9 is a diagram illustrating an example of a process queue in the example of the process according to this exemplary embodiment.

In Step 812, normal processes b and c are issued by another application processing apparatus 110 (see Step 812 in FIG. 9).

In Step 814, the apparatus 170 transmits the process acquisition request to the information processing apparatus 130 again.

In Step 816, the information processing apparatus 130 transmits the normal process b as a response to the apparatus 170. That is, the information processing apparatus 130 transmits the normal process b in the process queue to the apparatus 170 (see Step 816 in FIG. 9).

In Step 818, the apparatus 170 performs the process b.

In Step 820, the apparatus 170 notifies the information processing apparatus 130 of the processing result of the normal process b.

In Step 822, the information processing apparatus 130 transmits a response to the apparatus 170. The response includes NextHint set to 0.

In Step 824, the application processing apparatus 110 issues a second process a' to the information processing apparatus 130 (see Step 824 in FIG. 9).

In Step 826, the information processing apparatus 130 ends the first process a (see Step 826 in FIG. 9).

In Step 828, the apparatus 170 transmits the process acquisition request to the information processing apparatus 130 again.

In Step 830, the information processing apparatus 130 transmits the second process a' as a response to the apparatus 170. That is, the information processing apparatus 130 transmits the second process a' in the process queue to the apparatus 170 (see Step 830 in FIG. 9).

In Step 832, the apparatus 170 performs the second process a' (second process a).

In Step 834, the apparatus 170 notifies the information processing apparatus 130 of the processing result.

In Step 836, the information processing apparatus 130 transmits a response to the apparatus 170. The response includes NextHint set to 0.

In Step 838, the information processing apparatus 130 notifies the application processing apparatus 110 of the execution of the second process a.

When it takes no time for the application processing apparatus 110 to generate the process generating, the apparatus 170 may be kept waiting without returning a response (Step 808) after Step 802 (that is, the apparatus 170 is kept waiting until the application processing apparatus 110 generates the second process), the notification in Step 810 may be performed, and the generated second process may return as a response (Step 808) to Step 804.

However, since the number of requests to be processed by the apparatus 170 at the same time is limited, the operation of waiting for the process for a long time causes deterioration of the processing function of the information processing apparatus 130. Therefore, it is necessary to reduce the waiting time.

Information indicating whether to wait (whether a job generation time is short) is described in the first process when the application processing apparatus 110 generates the first process. Alternatively, when the designated value of the polling interval designated in the first process which is issued by the application processing apparatus 110 is sufficiently small (equal to or less than a predetermined time), the designation by the waiting time designating module 154 is not performed and the information processing apparatus 130 may keep the apparatus 170 waiting.

Figure 11:
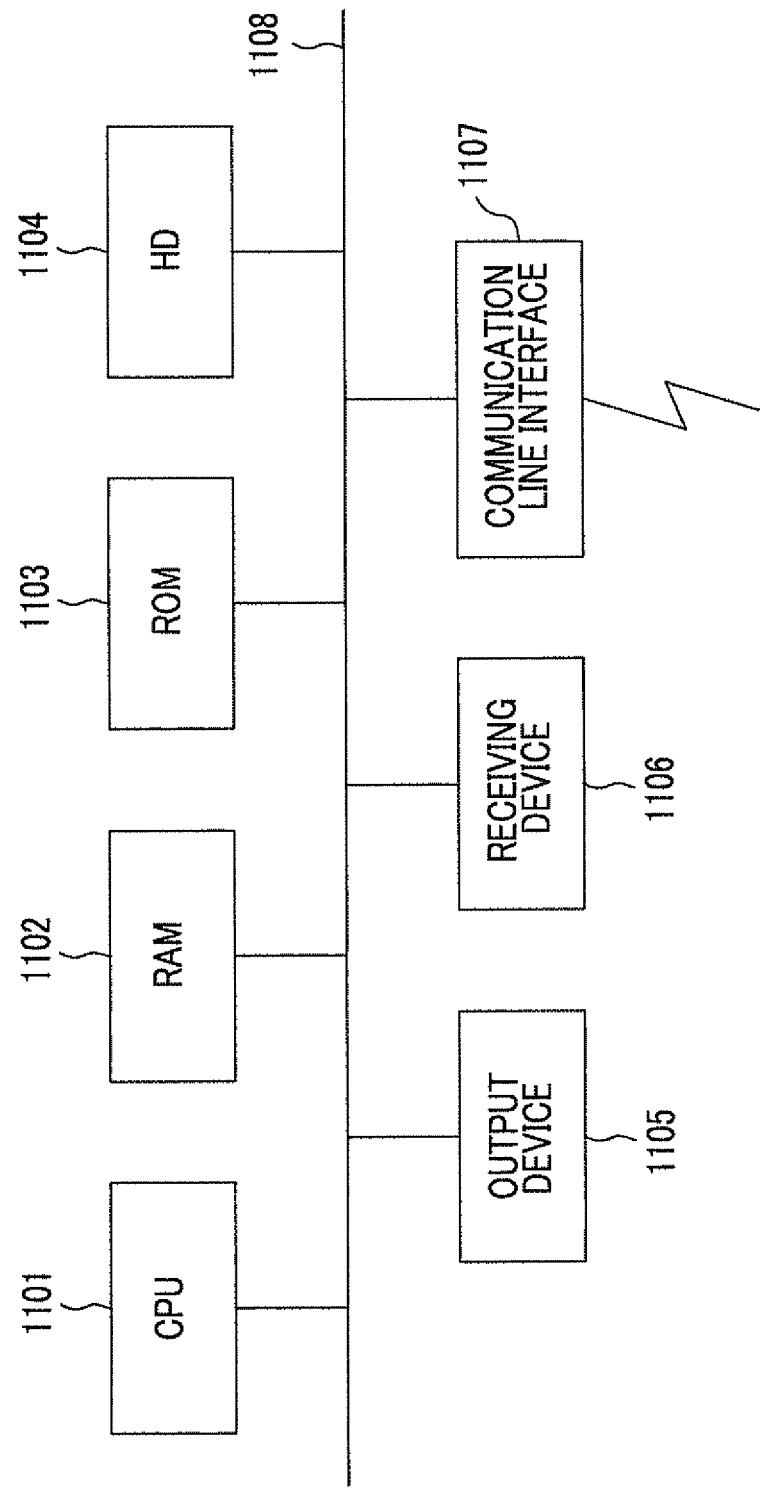
FIG. 11 is a block diagram illustrating an example of the hardware structure of a computer for implementing this exemplary embodiment (an application processing apparatus and an information processing apparatus)

FIG. 11 shows the hardware structure of a computer that executes a program and serves as the application processing apparatus 110 and the information processing apparatus 130 according to this exemplary embodiment. The computer is a general computer and is specifically a personal computer or a server. That is, for example, a Central Processing unit (CPU) 1101 is used as a processing unit (arithmetic unit), and a Random Access Memory (RAM) 1102, a Read Only Memory (ROM) 1103, and an HD 1104 are used as storage devices. For example, a hard disk may be used as the Hard Disk (HD) 1104. The computer includes the CPU 1101 that executes a program to implement the functions of, for example, the process reservation module 112, the process generating module 114, the communication module 116, the communication X module 132, the first process receiving module 134, the first process registration module 136, the communication Y module 140, the polling receiving module 142, the first process extracting module 144, the second process request module 146, the second process receiving module 148, and the second process output module 152, the RAM 1102 that stores the program or data, the ROM 1103 that stores, for example, a program for starting the computer, the RD 1104, which is an auxiliary storage device, a receiving device 1106 that receives data on the basis of the operation of the user for a keyboard, a mouse, or a touch panel, an output device 1105, such as a CRT or a liquid crystal display, a communication line interface 1107, such as a network interface card for connection to a communication network, and a bus 1108 that connects the devices for data communication. Plural computers may be connected to each other by a network.

For a computer program in the above-described exemplary embodiment, the system with this hardware structure reads the computer program, which is software, and the above-described exemplary embodiment is implemented by cooperation between software and hardware resources.

The hardware structure shown in FIG. 11 is an illustrative example, but this exemplary embodiment is not limited to the hardware structure shown in FIG. 11. This exemplary embodiment may have any configuration as long as it may execute the modules described in this exemplary embodiment. For example, some modules may be configured as dedicated hardware components (for example, ASIC) and some modules may be provided in an external system and connected by a communication line. In addition, plural systems shown in FIG. 11 may be connected to each other by a communication line so as to cooperate with each other.

Figure 12:
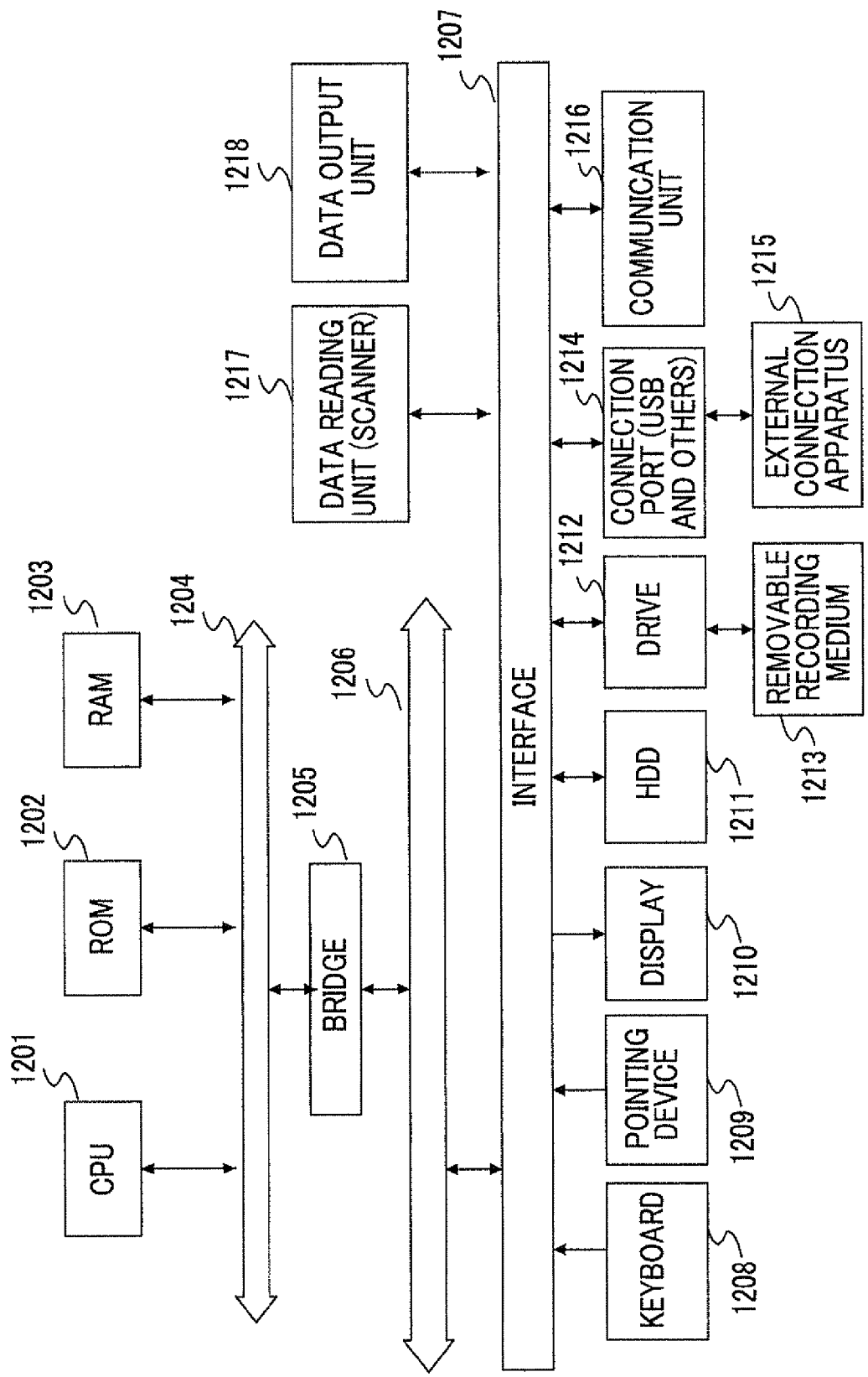
FIG. 12 is a block diagram illustrating an example of the hardware structure of a computer for implementing this exemplary embodiment (apparatus).

An example of the hardware structure of an image processing device of the apparatus 170 according to this exemplary embodiment will be described with reference to FIG. 12. The structure shown in FIG. 12 is formed by, for example, a personal computer (PC) and FIG. 12 shows an example of the hardware structure including a data reading unit 1217, such as a scanner, and a data output unit 1218, such as a printer.

A CPU 1201 is a controller that performs a process based on a computer program in which the execution sequence of various kinds of modules according to the above-described exemplary embodiment, that is, the communication module 172, the polling processing module 174, and the processing module 176 is described.

A ROM 1202 stores, for example, programs or operation parameters used by the CPU 1201. A RAM 1203 stores, for example, the program used in the execution of the CPU 1201 or parameters which are appropriately changed in the execution. These components are connected to each other by a host bus 1204 which is, for example, a CPU bus.

The host bus 1204 is connected to an external bus 1206, such as a Peripheral Component Interconnect/Interface (PCI) bus through a bridge 1205.

A keyboard 1208 and a pointing device 1209, such as a mouse, are input devices operated by the operator. A display 1210 is, for example, a liquid crystal display device or a Cathode Ray Tube (CRT) and displays various kinds of information as text or image information.

An HDD 1211 is provided with a hard disk and drives the hard disk to record or reproduce the program executed by the CPU 1201 or information. The hard disk stores, for example, the second process. In addition, the hard disk stores various other computer programs, such as data processing programs.

A drive 1212 reads data or programs recorded on an inserted removable recording medium 1213, such as a magnetic disk, an optical disc, a magneto-optical disc, or a semiconductor memory, and supplies the data or program to the RAM 1203 through an interface 1207, the external bus 1206, the bridge 1205, and the host bus 1204. The removable recording medium 1213 may be used as a data recording area, similarly to the hard disk.

A connection port 1214 is for connection to an external connection apparatus 1215 and has a connection unit, such as a USB or IEEE1394. The connection port 1214 is connected to, for example, the CPU 1201 through the interface 1207, the external bus 1206, the bridge 1205, and the host bus 1204. A communication unit 1216 is connected to a communication line and performs data communication with the outside. A data reading unit 1217 is, for example, a scanner and performs a process of reading a document. The data output unit 1218 is, for example, a printer and performs a process of outputting document data.

The hardware structure of the image processing device shown in FIG. 12 is an illustrative example, but this exemplary embodiment is not limited to the structure shown in FIG. 12. This exemplary embodiment may have any configuration as long as it may execute the modules described in this exemplary embodiment. For example, some modules may be configured as dedicated hardware components (for example, Application Specific Integrated Circuit: ASIC) and some modules may be provided in an external system and connected by a communication line. In addition, plural systems shown in FIG. 12 may be connected to each other by a communication line so as to cooperate with each other.

The above-mentioned program may be stored in a recording medium and then provided. In addition, the above-mentioned program may be provided by a communication unit. In this case, for example, the above-mentioned program may be understood as the invention of a "computer-readable recording medium having a program recorded thereon".

The "computer-readable recording medium having a program recorded thereon" refers to a computer-readable recording medium having a program recorded thereon which is used to, for example, install, execute, and distribute the program.

Examples of the recording medium may include digital versatile discs (DVDs), such as "DVD-R, DVD-RW, and DVD-RAM" which are the standards defined by the DVD Forum, and "DVD+R and DVD+RW" which are the standards defined by DVD+RW, compact discs (CDs), such as a read-only memory (CD-ROM), CD recordable (CD-R), and CD rewritable (CD-RW), a Blu-ray disc (registered trademark), a magneto-optical disc (MO), a flexible disk (FD), a magnetic tape, a hard disk, a read only memory (ROM), an electrically erasable programmable read-only memory (EEPROM (registered trademark)), a flash memory, a random access memory (RAM), and an SD (Secure Digital) memory card.

The program or a part thereof may be recorded and stored in the recording medium and then distributed. In addition, the program or a part thereof may be transmitted by communication using transmission media, such as wired networks including a local area network (LAN), a metropolitan area network (MAN), a wide area network (WAN), the Internet, an intranet, and an extranet, wireless communication networks, and combinations thereof. In addition, the program or a part thereof may be transmitted using carrier waves.

The program may be a part of another program, or it may be recorded on the recording medium along with a separate program. In addition, the program may be divided and recorded on plural recording media. In addition, the program may be recorded in any form including, for example, compression and encryption as long as it may be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to act as:

a first receiving unit that receives, from a first information processing apparatus, a reservation process, which is a reservation for transmission of a process to be performed by a second information processing apparatus;

a registration unit that registers the reservation process received by the first receiving unit in a memory;

a request unit that requests the first information processing apparatus to transmit the process to be performed by the second information processing apparatus when a communication is received from the second information processing apparatus and the reservation process is stored in the memory;

a second receiving unit that receives the process to be performed by the second information processing apparatus which is transmitted from the first information processing apparatus in response to the request from the request unit; and a transmitting unit that transmits the process received by the second receiving unit to the second information processing apparatus, wherein, when the communication is received from the second information processing apparatus and there is a process to be transmitted to the second information processing apparatus, the transmitting unit transmits the process to the second information processing apparatus wherein the reservation process includes a notice indicating that the first information processing apparatus is ready to transmit the process, and the reservation process includes a waiting time that is required to generate the process.

2. The information processing apparatus according to claim 1, further comprising:

a designation unit, wherein the first receiving unit receives a waiting time of the second information processing apparatus, when the communication is received from the second information processing apparatus and the reservation process is stored in the memory, the designation unit designates communication from the second information processing apparatus to the information processing apparatus after the waiting time received by the first receiving unit has elapsed, and when the communication is received from the second information processing apparatus after the waiting time, the transmitting unit transmits the process received by the second receiving unit to the second information processing apparatus.

3. The information processing apparatus according to claim 2, wherein, when the communication is received from the second information processing apparatus and there is a process to be transmitted to the second information processing apparatus, the transmitting unit transmits the process to the second information processing apparatus.

4. The information processing apparatus according to claim 2, wherein the first receiving unit receives the waiting time of the second information processing apparatus, and when the waiting time received by the first receiving unit is equal to or less than a predetermined time, the designation by the designation unit is not performed and the transmitting unit transmits the process received by the second receiving unit to the second information processing apparatus.

5. The information processing apparatus according to claim 1, wherein the first receiving unit receives the waiting time of the second information processing apparatus, and when the waiting time received by the first receiving unit is equal to or less than a predetermined time, the designation by the designation unit is not performed and the transmitting unit transmits the process received by the second receiving unit to the second information processing apparatus.

6. The information processing apparatus according to claim 3, wherein the first receiving unit receives the waiting time of the second information processing apparatus, and when the waiting time received by the first receiving unit is equal to or less than a predetermined time, the designation by the designation unit is not performed and the transmitting unit transmits the process received by the second receiving unit to the second information processing apparatus.

7. The information processing apparatus according to claim 2, wherein the first receiving unit receives an instruction indicating whether to perform the designation by the designation unit, and when the instruction received by the first receiving unit indicates that the designation by the designation unit is not performed, the designation by the designation unit is not performed and the transmitting unit transmits the process received by the second receiving unit to the second information processing apparatus.

8. The information processing apparatus according to claim 1, wherein the first receiving unit receives an instruction indicating whether to perform the designation by the designation unit, and when the instruction received by the first receiving unit indicates that the designation by the designation unit is not performed, the designation by the designation unit is not performed and the transmitting unit transmits the process received by the second receiving unit to the second information processing apparatus.

9. The information processing apparatus according to claim 3, wherein the first receiving unit receives an instruction indicating whether to perform the designation by the designation unit, and when the instruction received by the first receiving unit indicates that the designation by the designation unit is not performed, the designation by the designation unit is not performed and the transmitting unit transmits the process received by the second receiving unit to the second information processing apparatus.

10. A non-transitory computer readable medium storing an information processing program that causes a processor of a computer to function as:

a first receiving unit that receives, from a first information processing apparatus, a reservation process, which is a reservation for transmission of a process to be performed by a second information processing apparatus;

a registration unit that registers the reservation process received by the first receiving unit in a memory;

a request unit that requests the first information processing apparatus to transmit the process to be performed by the second information processing apparatus when a communication is received from the second information processing apparatus and the reservation process is stored in the memory;

a second receiving unit that receives the process to be performed by the second information processing apparatus which is transmitted from the first information processing apparatus in response to the request from the request unit; and
a transmitting unit that transmits the process received by the second receiving unit to the second information processing apparatus,
wherein, when the communication is received from the second information processing apparatus and there is a process to be transmitted to the second information processing apparatus, the transmitting unit transmits the process to the second information processing apparatus,
wherein the reservation process includes a notice indicating that the first information processing apparatus is ready to transmit the process, and the reservation process includes a waiting time that is required to generate the process.

* * * * *